United States Patent
Teragawa

(10) Patent No.: US 10,007,053 B2
(45) Date of Patent: Jun. 26, 2018

(54) LIGHT SOURCE DEVICE AND DISPLAY APPARATUS

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

(*) Notice: Subject to any disclaimer, the term of this patent is extended or adjusted under 35 U.S.C. 154(b) by 37 days.

(21) Appl. No.: 15/111,463

(22) PCT Filed: Jan. 30, 2014

(86) PCT No.: PCT/JP2014/052094
§ 371 (c)(1),
(2) Date: Jul. 13, 2016

(87) PCT Pub. No.: WO2015/114769
PCT Pub. Date: Aug. 6, 2015

(65) Prior Publication Data
US 2016/0341888 A1      Nov. 24, 2016

(51) Int. Cl.
*F21V 7/04*  (2006.01)
*F21V 8/00*  (2006.01)
*G02F 1/1335*  (2006.01)
*G02F 1/1333*  (2006.01)

(52) U.S. Cl.
CPC ..... *G02B 6/0088* (2013.01); *G02F 1/133308* (2013.01); *G02F 1/133615* (2013.01); *G02F 2001/13332* (2013.01); *G02F 2001/133314* (2013.01)

(58) Field of Classification Search
CPC ............. G02B 6/0088; G02F 1/133308; G02F 1/133615; G02F 2001/133314; G02F 2001/13332
USPC ......... 362/217.13, 217.17, 632, 633; 349/58, 349/65
See application file for complete search history.

(56) References Cited

U.S. PATENT DOCUMENTS

| 7,883,252 B2 * | 2/2011 | Matsui ................. G02B 6/0073 362/560 |
| 7,916,237 B2 * | 3/2011 | Jung .................... G02B 6/0081 349/58 |
| 8,240,863 B2 * | 8/2012 | Takeuchi .......... G02F 1/133308 349/58 |

(Continued)

FOREIGN PATENT DOCUMENTS

| JP | 2013-41811 A | 2/2013 |
| JP | 2013-41827 A | 2/2013 |
| WO | 2009008195 A1 | 1/2009 |

*Primary Examiner* — Tsion Tumebo
(74) *Attorney, Agent, or Firm* — Bret E. Field; Bozicevic, Field & Francis LLP

(57) ABSTRACT

A light source device comprising a light guide plate 11 receiving light from a light source through a side surface and emitting the light through one main surface; a reflection sheet 12 layered on another main surface of the light guide plate 11; and a housing having a back plate 13 provided with a recessed channel for reinforcement and housing the light guide plate 11 and the reflection sheet 11, further comprises a support member (spacer 13*f*) arranged in the recessed channel and partially supporting the reflection sheet 12 at the opening position of the recessed channel.

7 Claims, 14 Drawing Sheets

(56) References Cited

U.S. PATENT DOCUMENTS

| | | | | |
|---|---|---|---|---|
| 8,905,618 B2* | 12/2014 | Kuo | ................... | G02F 1/133608 |
| | | | | 362/632 |
| 8,976,312 B2* | 3/2015 | Li | ..................... | G02F 1/133308 |
| | | | | 348/790 |
| 8,985,796 B2* | 3/2015 | Li | ..................... | G02F 1/133603 |
| | | | | 362/285 |
| 8,988,630 B2* | 3/2015 | Kuo | .................... | G02B 6/0086 |
| | | | | 349/58 |
| 9,547,120 B2* | 1/2017 | Zhou | ................... | G02B 6/0085 |
| 2006/0109616 A1* | 5/2006 | Lee | ................... | G02F 1/133308 |
| | | | | 361/679.22 |
| 2006/0285362 A1* | 12/2006 | Cho | .................... | G02B 6/0068 |
| | | | | 362/633 |
| 2007/0229731 A1* | 10/2007 | Lan | ................... | G02F 1/133608 |
| | | | | 349/64 |
| 2010/0172154 A1* | 7/2010 | Takeuchi | .......... | G02F 1/133308 |
| | | | | 362/613 |
| 2010/0195015 A1* | 8/2010 | Okitsu | .............. | G02F 1/133608 |
| | | | | 349/58 |
| 2010/0271845 A1* | 10/2010 | Chiu | ................... | G02B 6/0081 |
| | | | | 362/633 |
| 2011/0292317 A1* | 12/2011 | Kim | ..................... | G02B 6/0088 |
| | | | | 349/61 |
| 2012/0236592 A1* | 9/2012 | Kang | ................ | G02F 1/133608 |
| | | | | 362/609 |
| 2013/0039036 A1 | 2/2013 | Son et al. | | |
| 2013/0044508 A1 | 2/2013 | Bae et al. | | |
| 2013/0063680 A1* | 3/2013 | Zhou | ....................... | G09F 13/04 |
| | | | | 349/62 |

\* cited by examiner

FIG. 1
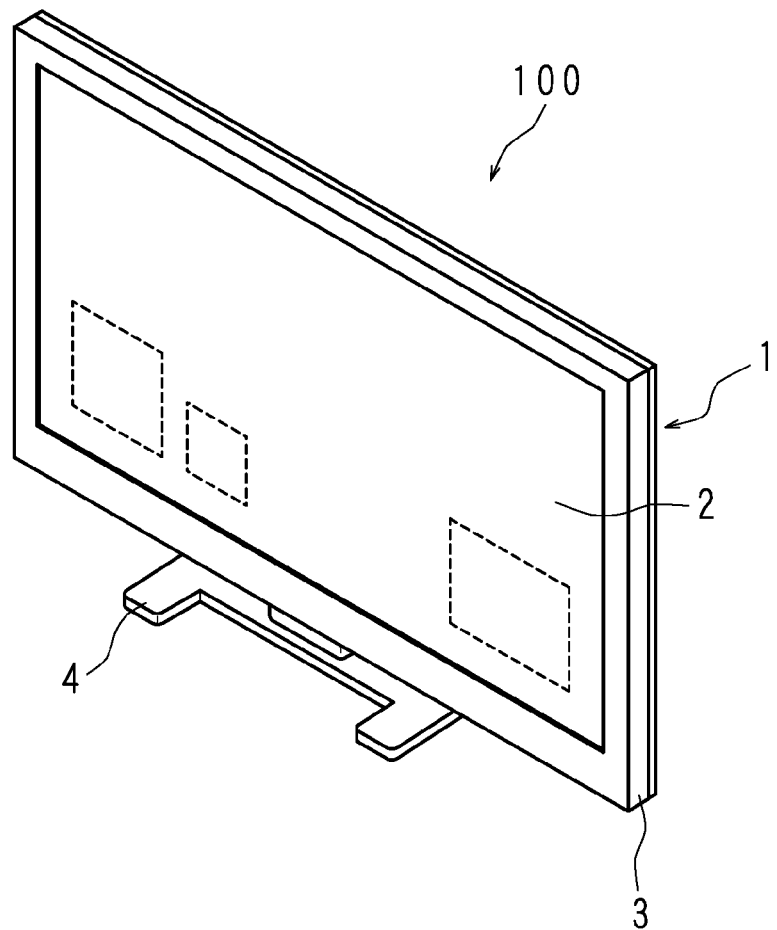
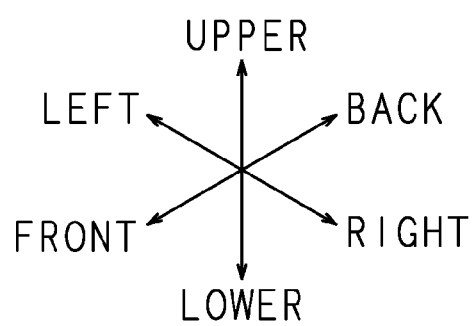

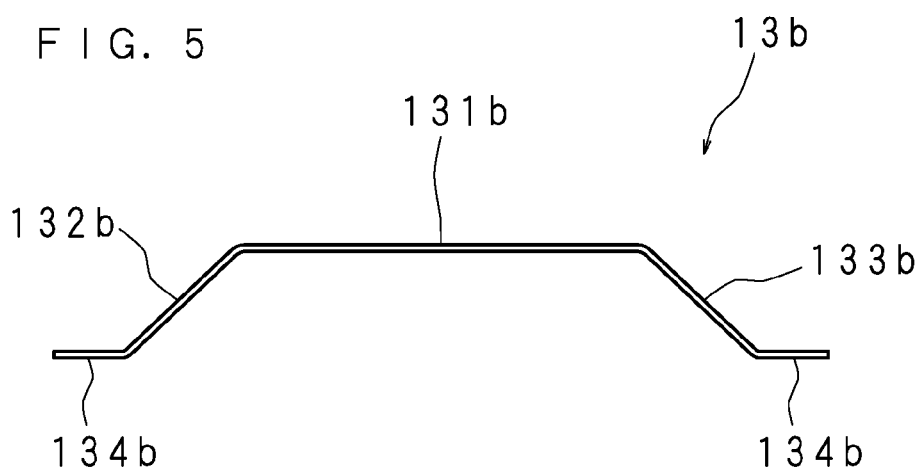
FIG. 5
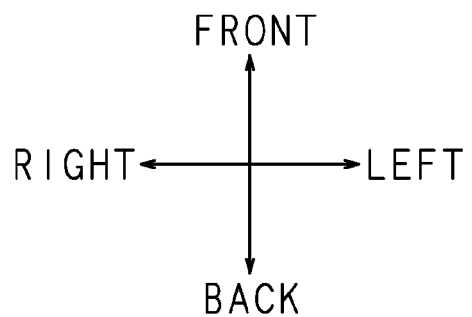

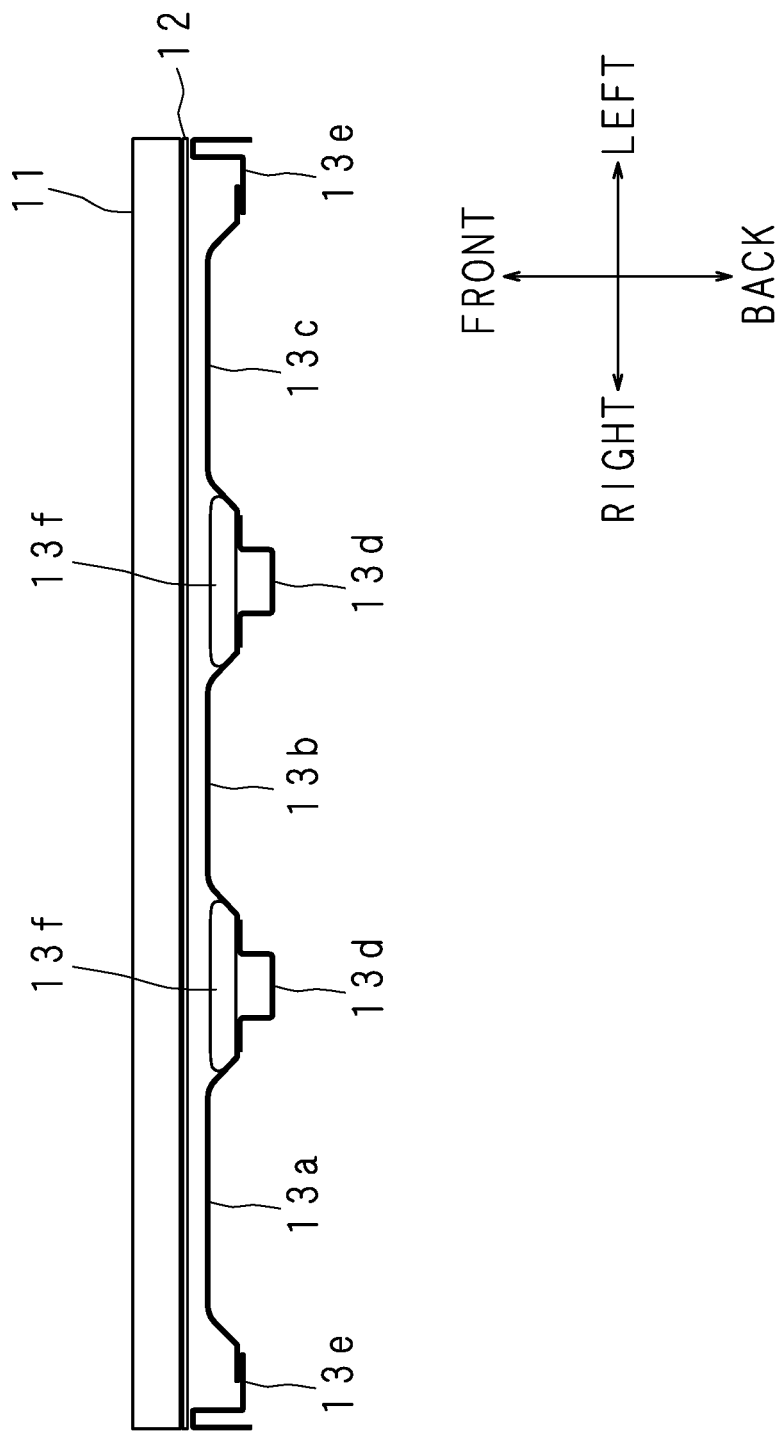

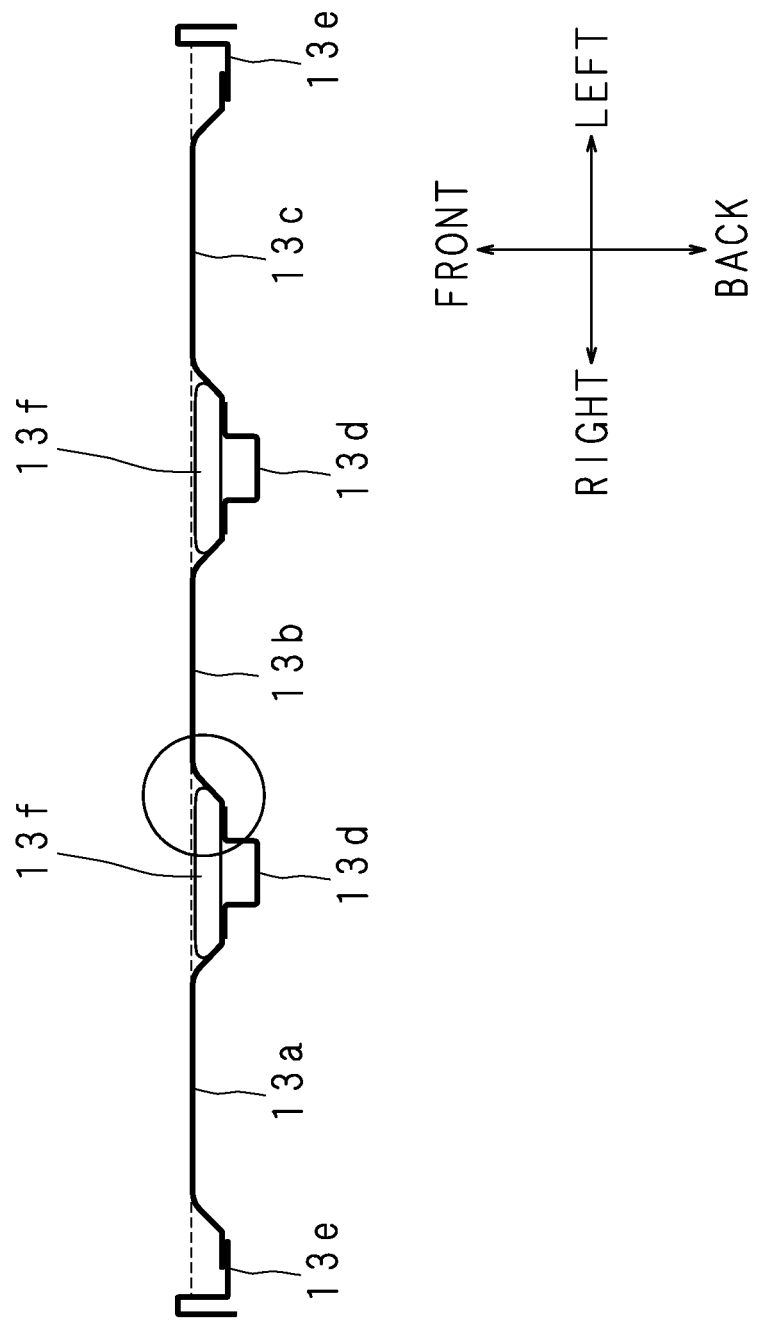

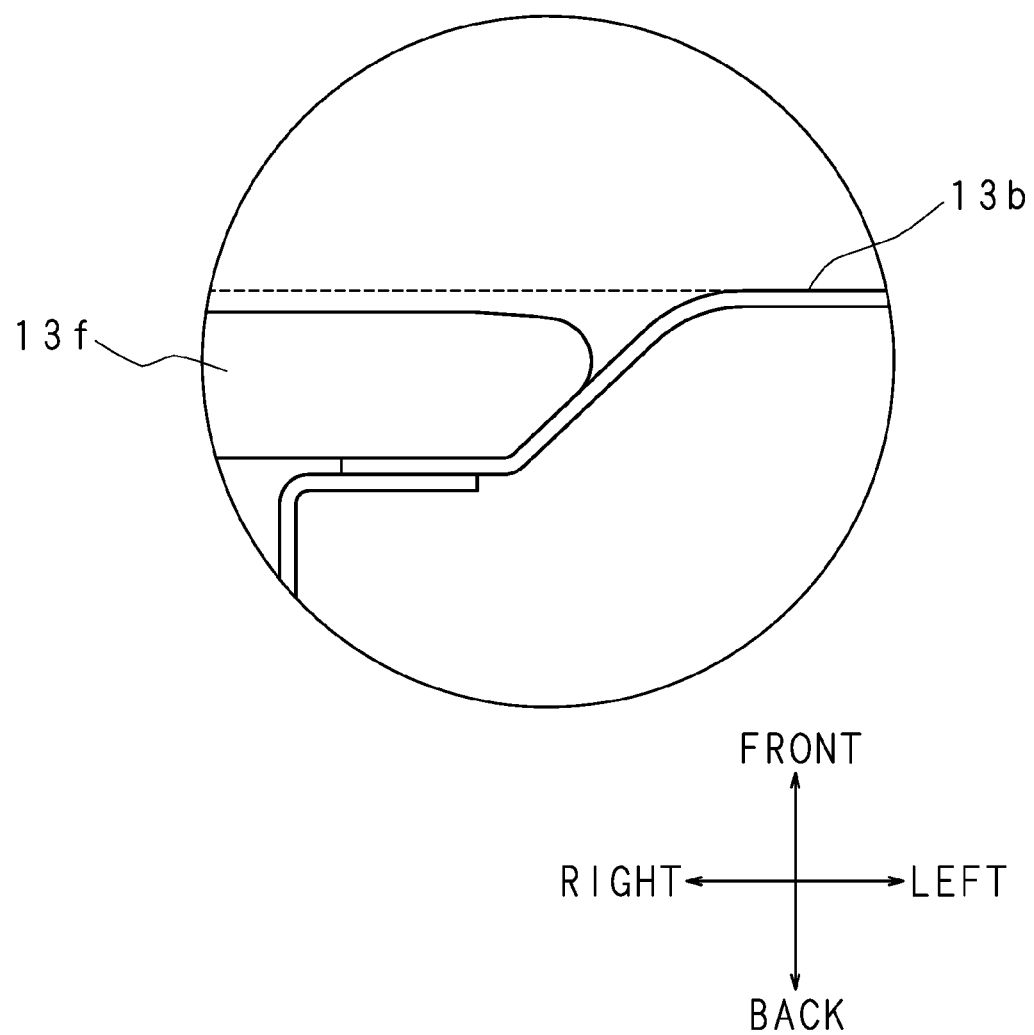

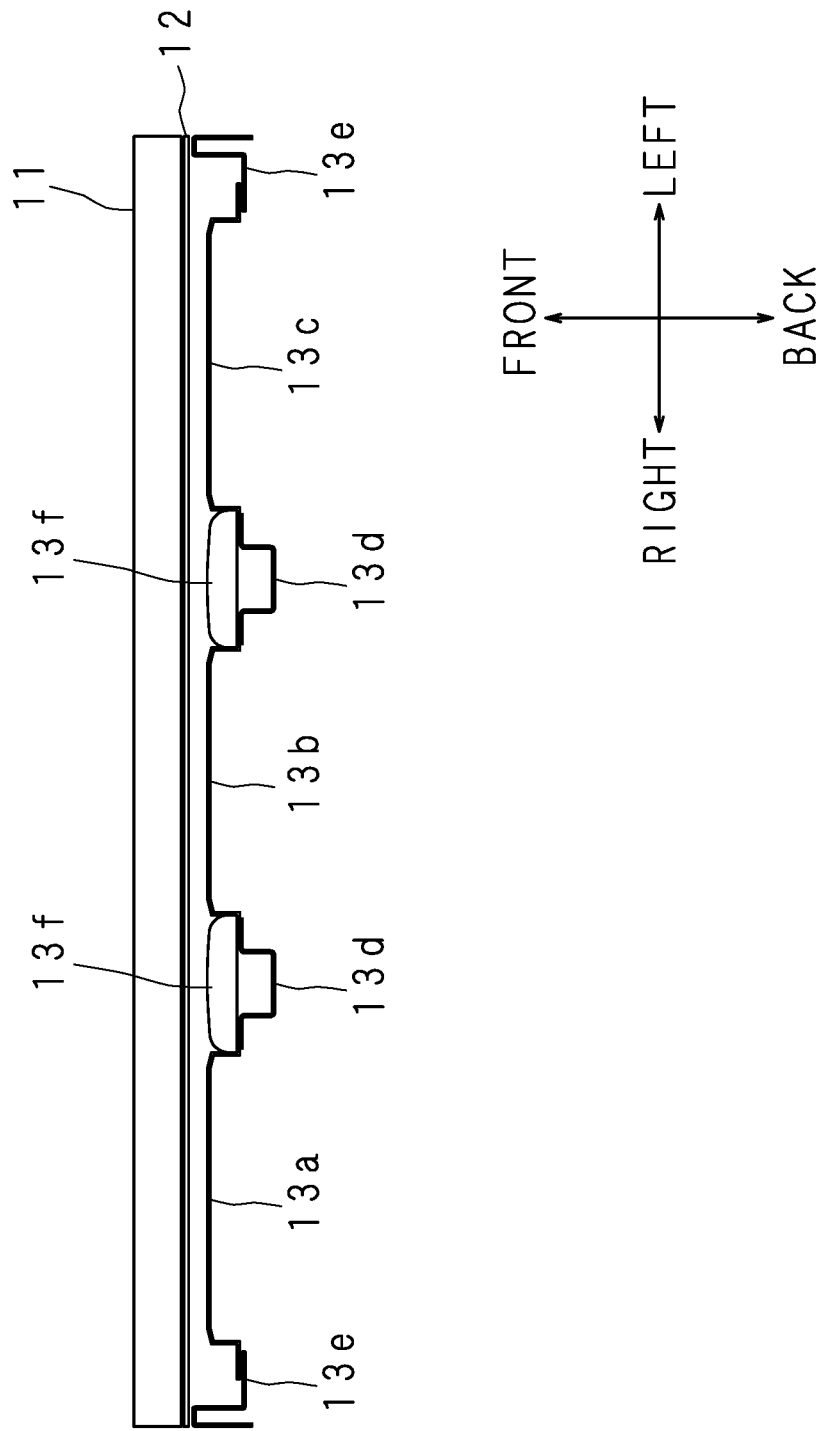

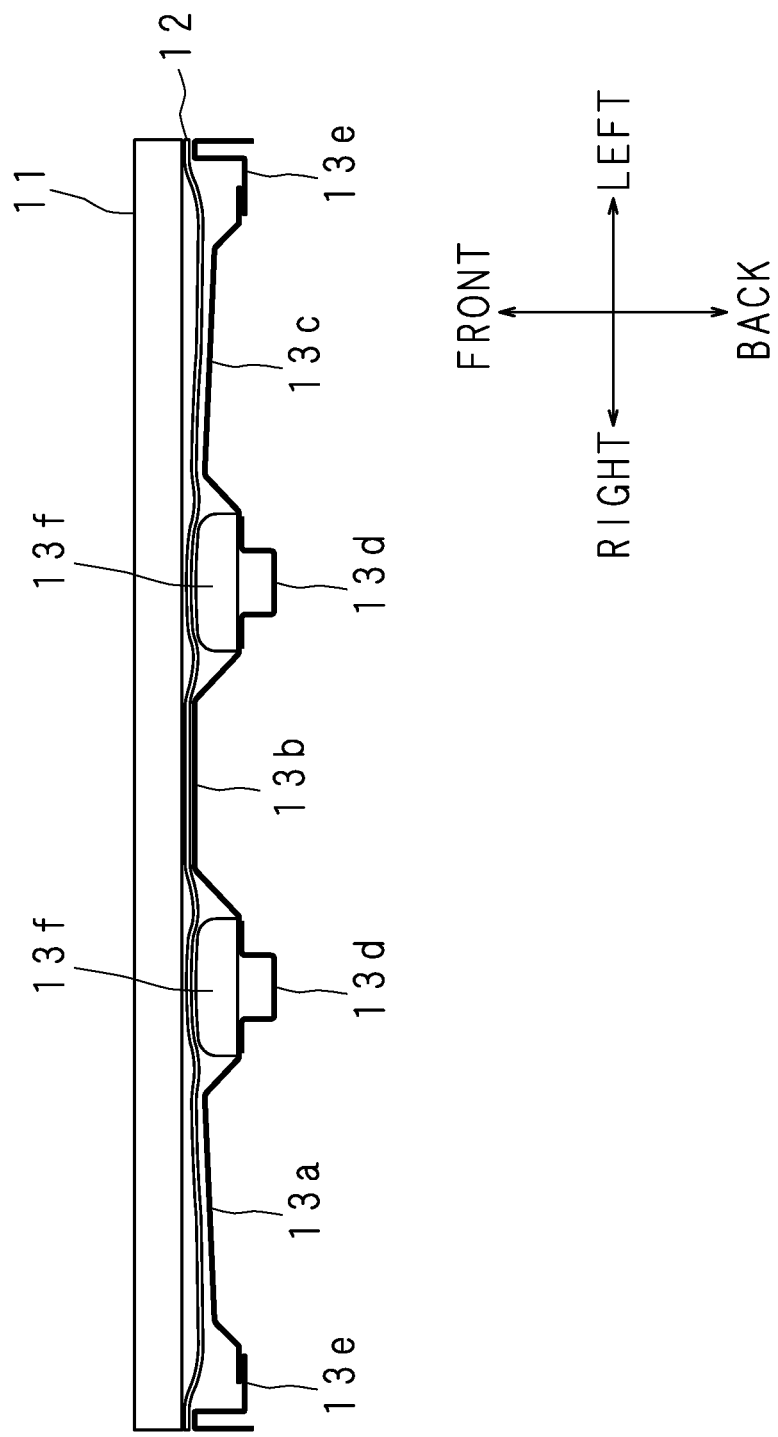

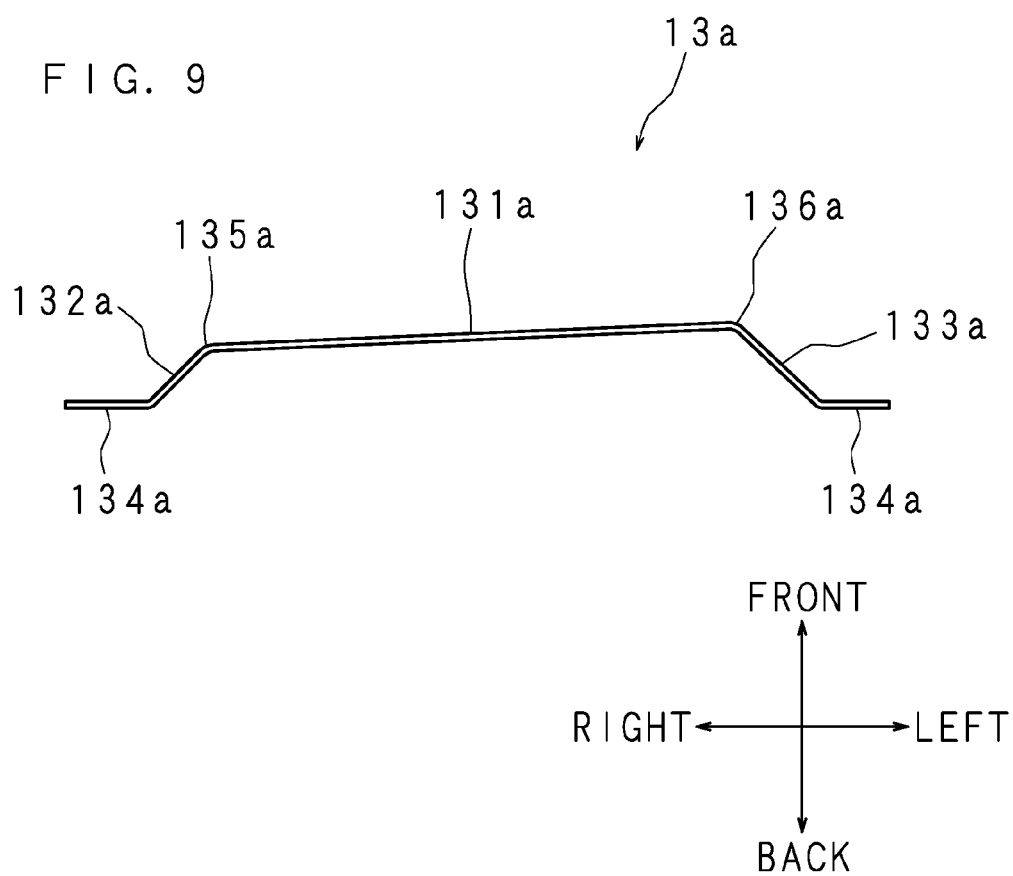

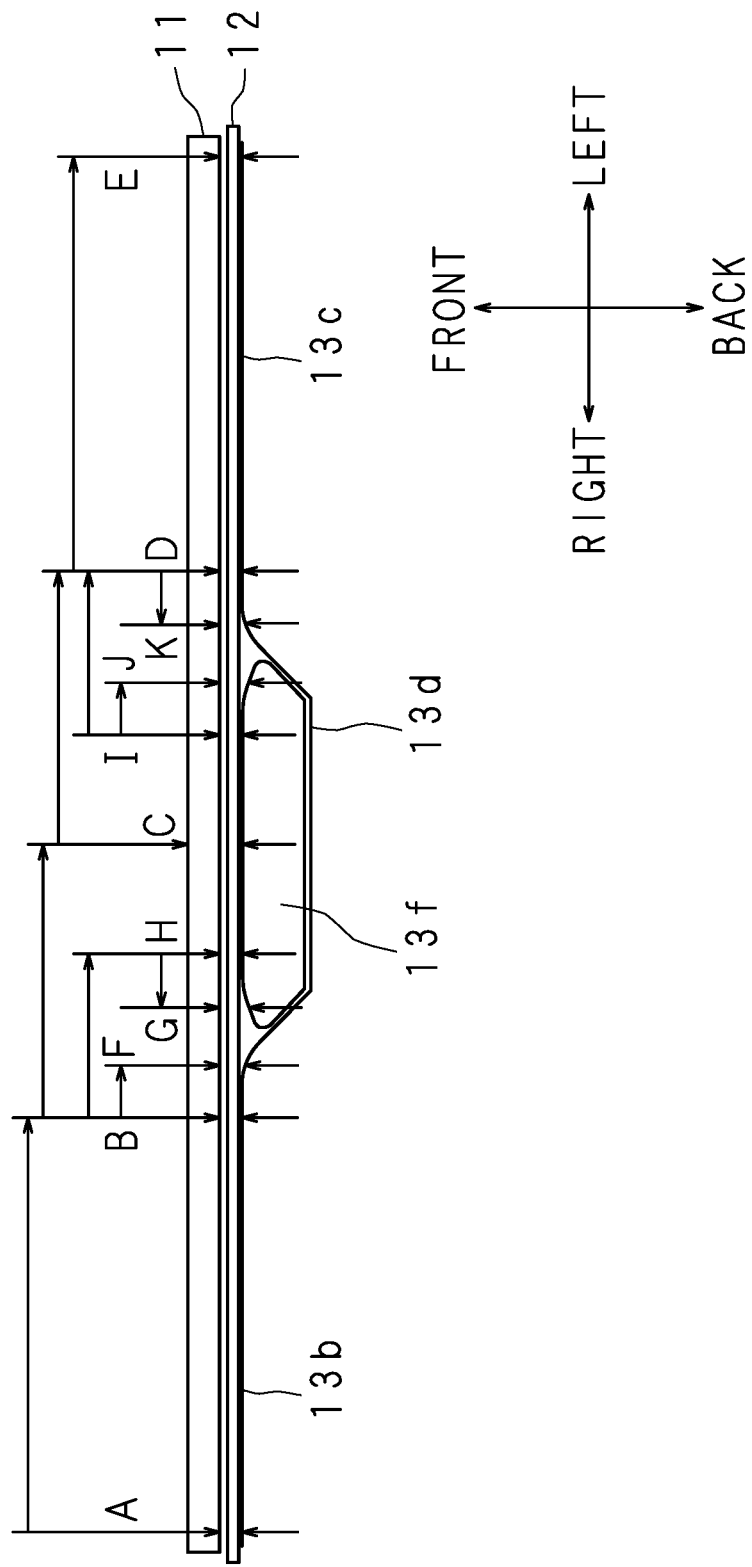

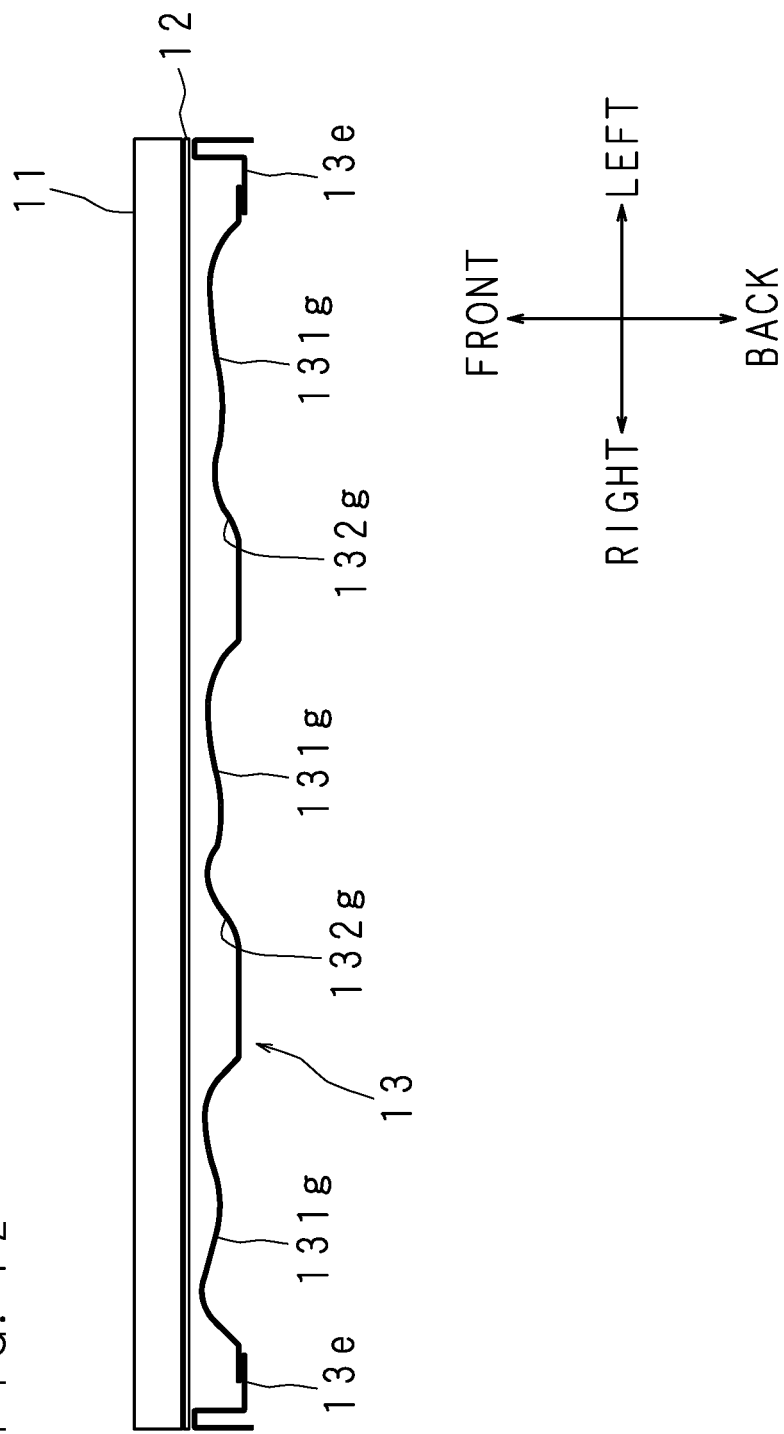

LIGHT SOURCE DEVICE AND DISPLAY APPARATUS

CROSS-REFERENCE TO RELATED APPLICATIONS

This application is the national phase under 35 U. S. C. § 371 of PCT International Application No. PCT/JP2014/052094 which has an International filing date of Jan. 30, 2014 and designated the United States of America.

FIELD

The present invention relates to a light source device including a light guide plate, a reflection sheet reflecting light emitted from one main surface of the light guide plate to the other main surface thereof and a housing in which the light guide plate and the reflection sheet are layered and housed, and to a display apparatus comprising the light source device.

BACKGROUND

In recent years, a display apparatus such as a liquid crystal display apparatus has widely been spread. The liquid crystal display apparatus is constituted by a liquid crystal panel and a backlight (light source device). In the liquid crystal display apparatus, one surface of the liquid crystal panel is irradiated with light from the backlight so that an image is displayed on the other surface. The backlight serves to planarly propagate the light from a light source unit through the inside thereof. The backlight includes a light guide plate having the shape of a rectangular plate emitting light from one main surface, a reflection sheet layered on the other main surface of the light guide plate, an optical sheet composed of multiple sheets for making the light emitted from the light guide plate into a uniform luminance distribution, and a backlight chassis having the shape of a rectangular parallelepiped box with one face being open. The backlight chassis houses the light source unit, light guide plate, reflection sheet and optical sheet.

The reflection sheet is held between the light guide plate and the backlight chassis.

In recent years, the size of the backlight chassis has been increased as the display apparatus is made larger. A large backlight chassis is generally fabricated by sheet-metal working of a steel plate in view of its strength and cost. Such a large backlight chassis is fabricated by dividing a steel plate into multiple members and then connecting the members together in order to prevent so-called oil canning which may cause abnormal noise (chattering noise) when vibrated and to facilitate the working

SUMMARY

A member for connecting the multiple members constituting the backlight chassis has a U-shaped cross section. This is to maintain the rigidity of the entire backlight. Thus, a gap between the backlight chassis and the reflection sheet has non-uniform dimensions. In the light source device of the edge light type including the light guide plate, the luminance tendency varies depending on the size of the gap between the reflection sheet and the light guide plate. As such, flexure in the reflection sheet may cause random luminance unevenness.

The present invention has been made in view of the circumstances described above, and aims to provide a light source device in which the luminance unevenness due to flexure in the reflection sheet is solved and also to provide a display apparatus comprising the light source device.

Means for Solving Problems

A light source device according to one embodiment of the present invention comprises a light guide plate receiving light from a light source through a side surface and emitting the light through one main surface and a reflection sheet layered on another main surface on the light guide plate are housed in a housing having a back plate provided with a recessed channel for reinforcement, and a support member arranged in the recessed channel and partially supporting the reflection sheet at an opening position of the recessed channel.

According to the embodiment of the present invention, a support member for partially supporting the reflection sheet at the opening position of the recessed channel is arranged in a recessed channel to prevent flexure in the reflection sheet. This can suppress the occurrence of the luminance unevenness caused by the flexure in the reflection sheet.

In the light source device according to the embodiment of the present invention, it is preferable that the back plate is constituted by arranging a plurality of plate-like members side by side and connecting the plate-like members with a connecting member.

According to the preferable embodiment of the present invention, the back plate is constituted by multiple plate-like members while plate-like members are connected by the connecting member, so that the back plate may be fabricated at a lower cost compared to the case where the back plate is formed of one plate.

In the light source device according to the embodiment of the present invention, it is preferable that the recessed channel is formed in the plate-like member.

According to the preferable embodiment of the present invention, the recessed channel is formed in the plate-like member, which can secure the rigidity of the plate-like member.

In the light source device according to the embodiment of the present invention, it is preferable that the recessed channel is formed by the connecting member and the plate-like member at a connected portion through the connecting member.

According to the preferable embodiment of the present invention, the recessed channel is formed of the connecting member and the plate member, which can secure the rigidity of the connecting portion of the plate-like member.

In the light source device according to the embodiment of the present invention, it is preferable that each of the plurality of plate-like members has a protrusion formed by a part of each of the plate-like members protruding inward and having a quadrangular cross-section in an arrangement direction of the plate-like members, the protrusion includes a proximate part configuring a leading end face and being proximate to the reflection sheet, an extension part extending from each end of the proximate part outward, and a second extension part extending in parallel with the reflection sheet from the extension part to another plate-like member in a direction of alignment, a corner formed by the proximate part and the extension part is rounded, and a dimension of at least a part of a gap between the proximate part and the reflection sheet is increased along a predetermined direction.

According to the preferable embodiment of the present invention, a corner formed by the proximate part and the extension part is rounded, which will not restrict the movement of the reflection sheet. Moreover, the dimensions of the gap between the proximate part and the reflection sheet are increased along a predetermined direction. This can prevent flexure in the reflection sheet and thus suppress the occurrence of the luminance unevenness caused by the flexure.

In the light source device according to the embodiment of the present invention, it is preferable that a corner formed by the proximate part and the extension part is not located closer to the reflection sheet than the proximate part included in the plurality of plate-like members and a plane including an end face of the support member that faces the reflection sheet.

According to the preferable embodiment of the present invention, a corner formed by the proximate part and the extension part is not located closer to the reflection sheet than the proximate part and the plane including the end face of the support member that faces the reflection sheet. That is, the corner formed by the proximate part and the extension part is retracted from the proximate part and the plane including the end face of the support member that faces the reflection sheet, so that the corner part is not locally narrower than the surrounding area. This can prevent the movement of the reflection sheet from being restricted at the corner part.

In the light source device according to the embodiment of the present invention, it is preferable that a dimension of a gap between the proximate part and the reflection sheet is minimum at a middle part of the reflection sheet and is increased with distance from the middle part.

According to the preferable embodiment of the present invention, the dimensions of the gap between the proximate part and the reflection sheet are minimum at the middle part of the reflection sheet and are increased with distance from the middle part. Thus, the flexure in the reflection sheet does not stay at the middle of the light source device, which can suppress the occurrence of the luminance unevenness caused by the flexure in the reflection sheet at the middle part of the light source device.

In the light source device according to the embodiment of the present invention, it is preferable that the dimension of the gap between the housing and the reflection sheet is minimum at a middle part and is increased with distance from the middle part along an arrangement direction of the plate-like members.

According to the preferable embodiment of the present invention, the dimensions of the gap between the housing and the reflection sheet are minimum at the middle part and is increased with distance from the middle part along the arrangement direction of the plate-like members. Thus, even if the light guide plate is warped due to heat, the reflection sheet will not be restricted from moving, which can suppress the occurrence of the luminance unevenness caused by the flexure in the reflection sheet.

In the light source device according to the embodiment of the present invention, it is preferable that the back plate is formed by bending one plate-like member.

According to the preferable embodiment of the present invention, the back plate is formed with one plate-like member, which can eliminate the work of connecting multiple plate-like members and can thus reduce the manufacturing cost, compared to the case with multiple back plates.

In the light source device according to the embodiment of the present invention, it is preferable that the plate-like member has a plurality of protrusions formed by a part of the plate-like member protruding inward, each of the protrusions having a quadrangular cross-section in an alignment direction of the plate-like members, the protrusion has a proximate part configuring a leading end face and being proximate to the reflection sheet, and an extension part extending in an outward direction from each end of the proximate part, the corner formed by the proximate part and the extension part is formed as a rounded corner, and a dimension of a gap between at least a part of the proximate part and the reflection sheet is increased along a predetermined direction.

According to the preferable embodiment of the present invention, a corner formed by the proximate part and the extension part is rounded, which will not restrict the movement of the reflection sheet. Moreover, the dimensions of the gap between the proximate part and the reflection sheet are increased along a predetermined direction. This can prevent the flexure in the reflection sheet and thus suppress the occurrence of the luminance unevenness caused by the flexure in the reflection sheet.

In the light source device according to the embodiment of the present invention, it is preferable that a corner formed by the proximate part and the extension part is not located closer to the reflection sheet than a plane including a plurality of proximate parts.

According to the preferable embodiment of the present invention, the corner formed by the proximate part and the extension part is located farther from the reflection sheet compared to the plane including multiple proximate parts. That is, the corner formed by the proximate part and the extension part is retracted from the plane including the end faces of multiple proximate parts that face the reflection sheet, so that the corner part is not locally narrowed compared to the surrounding area. This can prevent the movement of the reflection sheet from being restricted at the corner part.

A display apparatus according to one embodiment of the present invention comprises the light source device described above and a display panel provided at one main surface side of the light guide plate to display an image using light entering through the light guide plate.

According to the embodiment of the present invention, a light source device which can suppress the occurrence of luminance unevenness caused by flexure in the reflection sheet is provided, so that lowering in the display quality due to luminance unevenness can be prevented.

The light source device according to the present invention includes a support member in a recessed channel for supporting the reflection sheet at the opening position of the recessed channel, which can prevent flexure in the reflection sheet and can therefore suppress the occurrence of the luminance unevenness caused by the flexure.

The above and further objects and features will more fully be apparent from the following detailed description with accompanying drawings.

BRIEF DESCRIPTION OF THE DRAWINGS

FIG. 1 is a perspective view illustrating the outer appearance of a liquid crystal display apparatus according to Embodiment 1.

FIG. 5 is an explanatory view illustrating the shape of the middle plate-like part.

FIG. 6A is an explanatory view illustrating the positional relationship among the light guide plate, reflection sheet and back plate constituting the backlight.

FIG. 6B is an explanatory view illustrating the shape of the back plate.

FIG. 6C is a partially enlarged view of FIG. 6B.

FIG. 7 is an explanatory view illustrating the positional relationship among the light guide plate, reflection sheet and back plate constituting the backlight.

FIG. 8 is an explanatory view illustrating the positional relationship among the light guide plate, reflection sheet and back plate constituting the backlight.

FIG. 9 is an explanatory view illustrating the shape of the right plate-like part.

FIG. 10 is an explanatory view illustrating the positional relationship among the light guide plate, reflection sheet and back plate constituting the backlight.

FIG. 12 is an explanatory view illustrating the positional relationship among the light guide plate, reflection sheet and back plate constituting the backlight.

DETAILED DESCRIPTION

A light source device according to embodiments of the present disclosure will now be described in detail with reference to the drawings by taking as an example the case of being applied to a liquid crystal display apparatus comprising a so-called liquid crystal display panel.

Embodiment 1

FIG. 1 is a perspective view illustrating the outer appearance of a liquid crystal display apparatus 100 according to Embodiment 1. The liquid crystal display apparatus 100 includes a backlight (light source device) 1, a liquid crystal display panel (display panel) 2, a front cover 3 and a stand 4. The stand 4 is for the liquid crystal display apparatus 100 to be placed on a flat surface such as a table in a vertical orientation.

In the description below, the front, back, left, right, upper and lower directions are defined as indicated by the arrows in FIG. 1.

Figure 2:
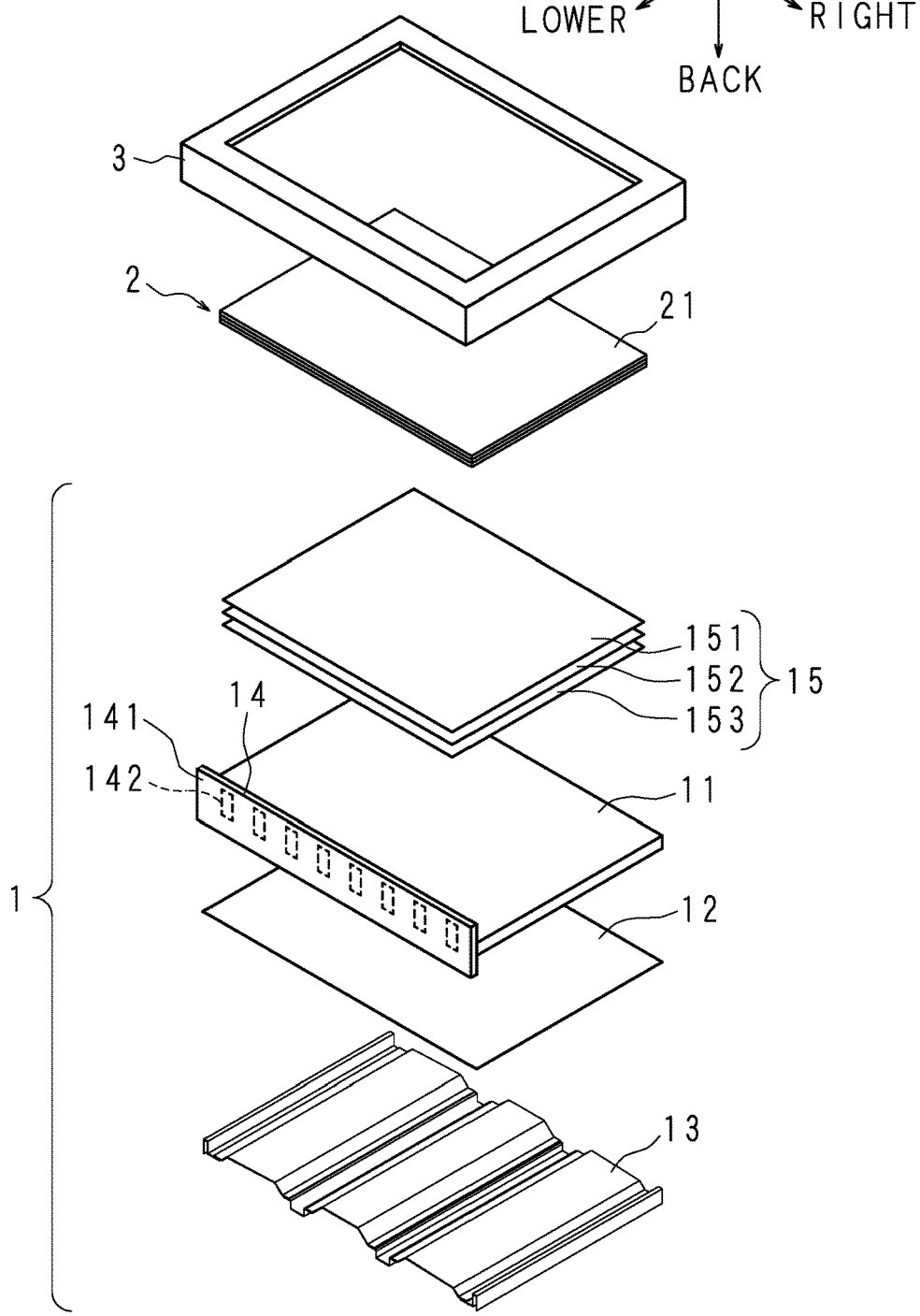
FIG. 2 is an exploded perspective view illustrating the configuration of the liquid crystal display apparatus according to Embodiment 1.

FIG. 2 is an exploded perspective view illustrating the configuration of the liquid crystal display apparatus 100 according to Embodiment 1. The stand 4 is not illustrated.

The backlight 1 emits light to the liquid crystal display panel 2. The liquid crystal display panel 2 has the shape of a rectangular plate. The liquid crystal display panel 2 receives light of the backlight 1 from the rear side to display an image on the front side. The front cover 3 has a frame-like shape which covers the peripheral edge of the liquid crystal display panel 2 from the front side.

The backlight 1 includes a light guide plate 11, a reflection sheet 12, a backlight chassis (housing), a light source unit 14 and an optical sheet 15. A back plate 13 constituting a part of the backlight chassis has the shape of a rectangular plate.

The light guide plate 11 is made of, for example, rectangular highly-transparent acrylic resin and has a predetermined thickness. The light guide plate 11 changes the light entering through a side surface into flat light and emits the flat light through one main surface.

The reflection sheet 12 is a rectangular sheet. The reflection sheet 12 totally reflects the light from the outside. The reflection sheet 12 has dimensions substantially equal to those of the light guide plate 11.

The light source unit 14 has a substrate 141 and light sources 142, 142 . . . 142 arranged side by side on the substrate 141. The light sources 142, 142 . . . 142 are, for example, light emitting diodes (LED). The light source unit 14 may also be configured with, for example, a light bulb, a hot-cathode fluorescent lamp, an electroluminescent device, a cold-cathode tube or the like.

The optical sheet 15 is a sheet for, e.g., diffusing or condensing light. For example, the optical sheet 15 is made of multiple layers of sheets, including a first diffusion sheet 151, a second diffusion sheet 153, and a prism sheet 152 interposed between the first diffusion sheet 151 and the second diffusion sheet 153.

As illustrated in FIG. 2, the backlight 1 is so configured that the reflection sheet 12, light guide plate 11 and the optical sheet 15 are layered in this order on the back plate 13 and housed while the light sources 142, 142 . . . that are arranged side by side on the substrate 141 are so disposed as to face one side surface of the light guide plate 11.

The light source unit 14 may be positioned near the other side surface of the long side or a side surface of the short side of the light guide plate 11, not limited to the position near the one side surface of the light guide plate 11. Moreover, the light source unit 14 may be provided at multiple locations, not limited to only one location.

Furthermore, the liquid crystal display panel 2 is superposed onto the optical sheet 15. Then, the front cover 3 is fixed to the backlight chassis while covering the peripheral part of the display surface of the liquid crystal display panel 2, to assemble the liquid crystal display apparatus 100.

Thus configured liquid crystal display apparatus 100 displays an image on the display surface of the liquid crystal display panel 2 through the following operation. The light emitted by the light sources 142, 142 . . . of the light source unit 14 enters the light guide plate 11 through one side surface which faces the light sources. The light entering the light guide plate 11 is irregularly reflected by a pattern formed inside the light guide plate 11 and is emitted through the main surface which faces the optical sheet 15. A part of the light entering the light guide plate 11 is totally reflected by the reflection sheet 12 provided at the backlight chassis side, and is emitted through the main surface which faces the optical sheet 15.

The light emitted from the light guide plate 11 is diffused by the second diffusion sheet 153 and enters the prism sheet 152. The prism sheet 152 condenses the incident light to emit the light toward the liquid crystal display panel 2. The light emitted from the prism sheet 152 enters the first diffusion sheet 151 in a direction perpendicular to the prism sheet 152. The first diffusion sheet 151 further diffuses the light entering through the prism sheet 152 to form a more uniform luminance distribution, and emits the light toward the liquid crystal display panel 2.

The light entering from the first diffusion sheet 151 to the liquid crystal display panel 2 is controlled by the liquid crystal enclosed in the liquid crystal display panel 2, and an image is formed on the display surface.

Figure 3:
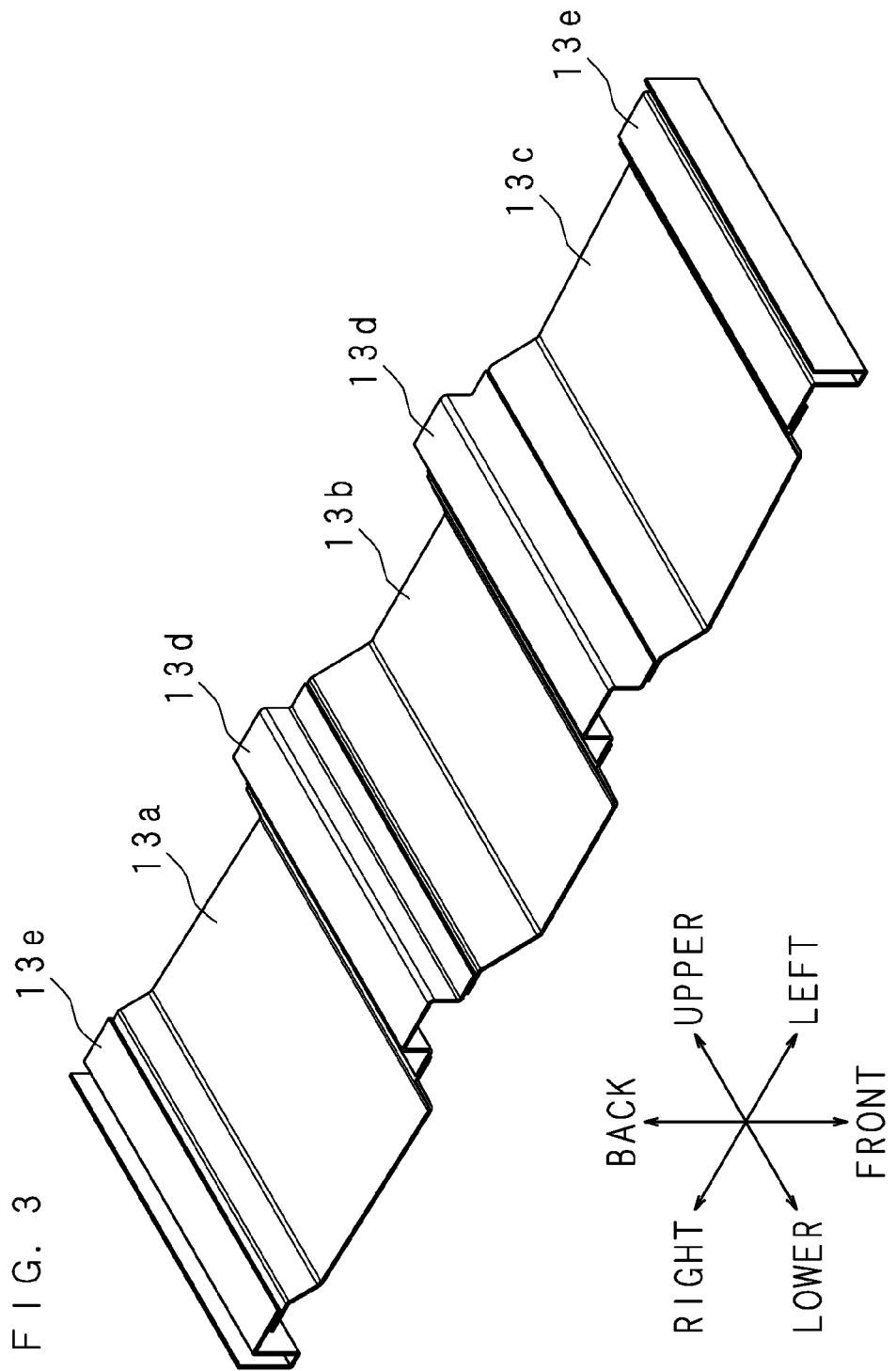
FIG. 3 is a perspective view of the back plate which is a part of the backlight chassis.

FIG. 3 is a perspective view of the back plate 13 which is a part of the backlight chassis. The back plate 13 includes a right plate-like part 13a, a middle plate-like part 13b, a left plate-like part 13c, two connecting members 13d and two end members 13e. The right plate-like part 13a and the middle plate-like part 13b are connected by the connecting member 13d. The middle plate-like part 13b and the left plate-like part 13c are connected by the connecting member 13d. The sides opposite to the respective sides of the right plate-like part 13a and the left plate-like part 13c that are connected to the middle plate-like part 13b are connected to the end members 13e.

Figure 4:
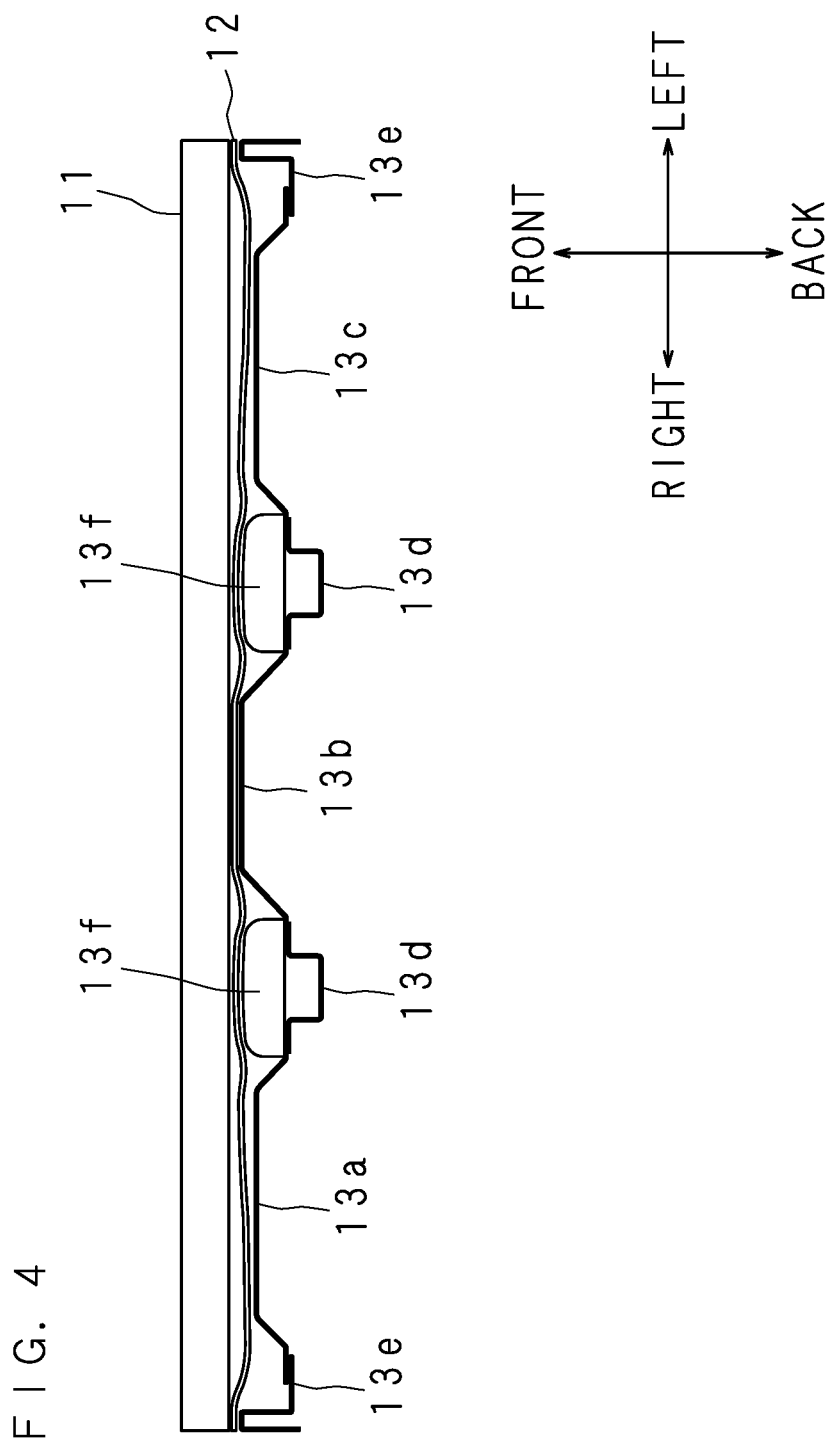
FIG. 4 is an explanatory view illustrating the positional relationship among the light guide plate, reflection sheet and back plate constituting the backlight.

FIG. 4 is an explanatory view illustrating the positional relationship among the light guide plate 11, reflection sheet 12 and back plate 13 constituting the backlight 1. FIG. 5 is an explanatory view illustrating the shape of the middle plate-like part 13b. FIGS. 4 and 5 illustrate the backlight 1 viewed from the above. The reflection sheet 12 and the light guide plate 11 are layered in this order on the back plate 13.

The middle plate-like part 13b constituting the back plate 13 has the shape of an isosceles trapezoid without a lower base portion (rear side). The middle plate-like part 13b includes a proximate part 131b corresponding to the upper base of the trapezoid, extension parts 132b, 133b corresponding to the legs of the trapezoid, and second extension parts 134b, 134b.

The proximate part 131b is a leading end face of a protrusion, and is closest to the reflection sheet 12. The extension parts 132b, 133b extend diagonally rearward from the proximate part 131b. The second extension part 134b extends in a direction substantially parallel to the reflection sheet 12 from each of the extension parts 132b, 133b. Each of the right plate-like part 13a and the left plate-like part 13c also has, as in the middle plate-like part 13b, the shape of an isosceles trapezoid without a lower base portion (rear side). The right plate-like part 13a, the middle plate-like part 13b and the left plate-like part 13c are formed, for example, by pressing a steel plate.

Each of the two connecting members 13d has the shape of a channel steel. The right plate-like part 13a, middle plate-like part 13b or left plate-like part 13c is connected with the connecting member 13d by screwing.

At each of the portion where the right plate-like part 13a and the middle plate-like part 13b are connected by the connecting member 13d and the portion where the middle plate-like part 13b and the left plate-like part 13c are connected by the connecting member 13d, a recessed channel is formed in order to increase the rigidity of the surface.

Since a recessed channel is formed in the back plate 13, the dimensions of the gap between that portion with the groove and the reflection sheet 12 are relatively larger than the dimensions of the gaps at the other portions of the back plate 13. Thus, a spacer 13f (support member) is disposed in the recessed channel in order to fill the gap.

According to Embodiment 1, as the recessed channel formed to increase the rigidity of the back plate 13 is filled with the spacer 13f, the variation in the dimensions of the gap between the back plate 13 and the reflection sheet 12 depending on the position is made smaller. This can minimize the flexure in the reflection sheet 12 as well as the unevenness in luminance depending on the position.

Embodiment 2

In Embodiment 2, such an improvement has been made that the reflection sheet 12 does not get stuck with the back plate 13 when the reflection sheet 12 moves on the back plate 13 of the backlight chassis.

FIG. 6A is an explanatory view illustrating the positional relationship among the light guide plate 11, reflection sheet 12 and back plate 13 constituting the backlight 1. FIG. 6A illustrates the view from the above. As illustrated in FIG. 6A, right and left corners at the front side of the right plate-like part 13a, middle plate-like part 13b and left plate-like part 13c are chamfered. That is, the corners are rounded to form round corners. Accordingly, when the reflection sheet 12 moves, it will not get caught by any corner of the right plate-like part 13a, middle plate-like part 13b or left plate-like part 13c, which can prevent the reflection sheet 12 from being loose.

FIG. 6B is an explanatory view illustrating the shape of the back plate 13. FIG. 6B illustrates a view from the above, similarly to FIG. 6A. As illustrated in FIG. 6B, the right and left corners at the front side of the spacers 13f are rounded to be round corners. This prevents the reflection sheet 12 from getting caught by the corners of the respective spacers 13f when moved, which can avoid the reflection sheet 12 being loose.

FIG. 6C is a partially enlarged view of FIG. 6B. The portion enclosed by the circle in FIG. 6B is enlarged. The horizontal dot line indicated in FIG. 6C illustrates a part of a plane (hereinafter referred to as an "imaginary plane") including a surface of the middle plate-like part 13b that faces the reflection sheet 12 and a surface of the right plate-like part 13a that faces the reflection sheet 12. As illustrated in FIG. 6C, the corner of the spacer 13f at the front side is located at the back side of the imaginary plane. This prevents the reflection sheet 12 from getting stuck with the corners of the respective spacers 13f when moved, which can avoid the reflection sheet 12 being loose.

As has been described above, according to Embodiment 2, the respective right and left corners at the front side of the right plate-like part 13a, middle plate-like part 13b and left plate-like part 13c are rounded to be round corners. Moreover, the right and left corners at the front side of the spacers 13f are rounded to be round corners. This prevents the reflection sheet 12 from getting caught by any corner of the right plate-like part 13a, middle plate-like part 13b, left plate-like part 13c and spacers 13f even when the reflection sheet 12 is moved, which can avoid the reflection sheet 12 being loose. As a result, luminance unevenness due to loosening of the reflection sheet 12 may be prevented, so that lowering in the display quality may further be prevented.

Embodiment 3

FIG. 7 is an explanatory view illustrating the positional relationship among the light guide plate 11, reflection sheet 12 and back plate 13 constituting the backlight 1. FIG. 7 illustrates the backlight 1 viewed from the above. While Embodiments 1 and 2 illustrate examples where each of the right plate-like part 13a, middle plate-like part 13b and left plate-like part 13c has the shape of an isosceles trapezoid, each of these parts may alternatively be formed in a rectangular shape as illustrated in FIG. 7. Since each of the right plate-like part 13a, middle plate-like part 13b and left plate-like part 13c is formed in a rectangular shape, the rigidity of the back plate 13 may be increased compared to the case where each of the parts has the shape of an isosceles trapezoid. Furthermore, even if the right plate-like part 13a, middle plate-like part 13b and left plate-like part 13c are molded through a bending work, precise dimensions may be achieved.

Embodiment 4

In Embodiment 4, the shape of the back plate 13 of the backlight chassis may be so devised as to avoid flexure in the reflection sheet 12. Even if the gap between the back plate 13 and the reflection sheet 12 has very small dimensions, appropriate movement of the reflection sheet 12 is restricted in the case where a locally narrow part occurs, causing flexure in the reflection sheet 12. This may generate unevenness in luminance. Embodiment 2 addresses this problem.

FIG. 8 is an explanatory view illustrating the positional relationship among the light guide plate 11, reflection sheet 12 and back plate 13 constituting the backlight 1. FIG. 9 is an explanatory view illustrating the shape of the right plate-like part 13a. FIGS. 8 and 9 illustrate the backlight 1 viewed from the above, as in FIGS. 4 and 5. The right plate-like part 13a is a part located on the right in the left-right direction of the backlight 1. Unlike Embodiment 1, the right plate-like part 13a is not formed in a trapezoidal shape. As illustrated in FIG. 9, the dimensions of the gap between the reflection sheet 12 and the left side (right side in the drawing sheet) of the proximate part 131a are relatively small whereas the dimensions of the gap between the reflection sheet 12 and the right side (left side in the drawing sheet) of the proximate part 131a are relatively large. The proximate part 131a is inclined so that the left side (right side in the drawing sheet) of the proximate part 131a is located forward (upper in the drawing sheet) compared to the right side (left side in the drawing sheet).

Furthermore, corners 135a, 136a formed by the proximate part 131a and the extension part 132a and by the proximate part 131a and the extension part 133a are rounded. This can prevent the reflection sheet 12 from getting caught by the corners 135a, 136a and being restricted from moving, which therefore prevents the reflection sheet 12 from being loose.

Since the left plate-like part 13c and the right plate-like part 13a are symmetrically formed, the left plate-like part 13c will not be illustrated and described in detail. As the left plate-like part 13c has a shape symmetrical to the right plate-like part 13a, the leading end face of the protrusion of the left plate-like part 13c has a smaller gap between itself and the reflection sheet 12 toward right, whereas it has a larger gap between itself and the reflection sheet 12 toward left.

In Embodiment 4, the proximate part 131a or the like of the right plate-like part 13a is configured to diagonally face the reflection sheet 12, so that the gap between the back plate 13 and the reflection sheet 12 is not locally narrow. Moreover, a corner 135a formed by the proximate part 131a and the extension part 132a is rounded, so as to prevent the reflection sheet 12 from getting caught by the corner and being restricted from moving, which therefore prevents the reflection sheet 12 from being loose. This can prevent the luminance unevenness caused by flexure in the reflection sheet 12.

Embodiment 5

According to Embodiment 4, the dimensions of the gap between the reflection sheet 12 and each of the right plate-like part 13a, middle plate-like part 13b and the left plate-like part 13c are varied depending on the position in the left-right direction. That is, the variation is local for the entire back plate 13. In Embodiment 5, two-dimensional variation is employed to prevent the flexure in the reflection sheet 12 over the entire backlight 1. It is thus configured that the gap between the back plate 13 and the reflection sheet 12 is relatively minimum near the middle of the backlight 1, while the dimensions of the gap are increased toward the outer sides.

In the backlight 1, the internal temperature is raised due to the heat emitted by the light source 142 after started being operated. Thus, the members constituting the backlight 1 are expanded. This causes flexure in the reflection sheet 12. Luminance unevenness occurring at the middle part due to the flexure greatly affects the quality of the product.

As described above, according to the present embodiment, the gap for the reflection sheet 12 is the smallest near the center of the backlight 1 and is larger toward the outer sides. Accordingly, in the case where the reflection sheet 12 undergoes flexure, the flexure is shifted from the middle to the outer sides. While luminance unevenness occurring at the middle part greatly affects the quality of the product, lowering in the quality may be minimum by shifting the flexure from the middle to the outer sides.

Embodiment 6

In Embodiment 6, the distance between the reflection sheet 12 and the back plate 13 is entirely changed along the left-right direction. Furthermore, instead of the right plate-like part 13a, middle plate-like part 13b and left plate-like part 13c formed as separate members, the back plate 13 may be formed as one piece of plate.

FIG. 10 is an explanatory view illustrating the positional relationship among the light guide plate 11, reflection sheet 12 and back plate 13 constituting the backlight 1. FIG. 10 illustrates a portion of the back plate 13 and so forth. The sets of arrows with arrow heads vertically facing each other in FIG. 10 are illustrated to show the dimensions of the gap between the light guide plate 11 and the back plate 13 or spacer 13f.

The sets of arrows indicating dimensions of the gap are denoted by A to K. A indicates a central position in the longitudinal direction of the back plate 13. B indicates a position of a flat portion of the middle plate-like part 13b which is close to the spacer 13f. C indicates a position at the center of the spacer 13f. D indicates a position of a flat portion of the left plate-like part 13c which is close to the spacer 13f. E indicates a position of the left plate-like part 13c closer to the outer side than D. F indicates a position of a bent R part of a flat portion of the middle plate-like part 13b which is close to the spacer 13f. G indicates a position of a corner R part of the spacer 13f near the middle plate-like part 13b. H indicates a position of the spacer 13f which is close to the middle plate-like part 13b. I indicates a position of the spacer 13f which is close to the left plate-like part 13c. J indicates a position of a corner R part near the spacer 13f. K indicates a position of a bent R part near the spacer 13f of the left plate-like part 13c. It is noted that the bent R part refers to the corner part of a plate member when bent to have a curved surface at the corner.

When the dimensions of the gap between the light guide plate 11 and the back plate 13 at the positions denoted by A to K are referred to as A to K, respectively, the dimensions have the following relationship in terms of size.

$$A<B<C<D<E \quad (1)$$

The representation (1) indicates that the gap has larger dimensions as it is closer to the outer side of the backlight 1. As such, even if the reflection sheet 12 is expanded, the expansion will not be inhibited.

$$B<H, I<D \quad (2)$$

The representation (2) indicates that the gap between the spacer 13f and the light guide plate 11 has dimensions larger than those of the gap between the light guide plate 11 and the back plate 13 located closer to the inner side than the spacer 13f. The representation (2) further indicates that the gap between the spacer 13f and the light guide plate 11 has dimensions smaller than those of the gap between the light guide plate 11 and the back plate 13 located closer to the outer side than the spacer 13f. As such, even if the reflection sheet 12 is expanded, the expansion will not be inhibited.

$$B<F, H<G, I<J, D<K \quad (3)$$

The representation (3) indicates that the gap between the light guide plate 11 and the corner R part or the corner of the spacer 13f has dimensions larger than those of the gap in the vicinity thereof between the light guide plate 11 and the back plate 13 or the spacer 13f. This can prevent the reflection sheet 12 from being locally loosened even if the reflection sheet 12 is expanded.

By setting the relationship among the gap dimensions at multiple positions, if the reflection sheet 12 is loosened, the loosened part tends to be transferred from the middle part to the right and left parts (outer sides). Thus, the luminance unevenness due to the loosening of the reflection sheet 12 is shifted from the middle part to the right and left sides thereby being less recognizable, which can prevent significant lowering in the display quality of the liquid crystal display apparatus 100.

It is also possible to apply the configuration described with reference to FIG. 10 to each of Embodiments 1 to 5 in which the back plate 13 is constituted by multiple members.

Embodiment 7

According to Embodiment 4, the dimensions of the gap between the reflection sheet 12 and each of the right plate-like part 13a, middle plate-like part 13b and the left plate-like part 13c are varied depending on the position in the left-right direction. That is, the variation is local for the entire back plate 13. According to Embodiment 7, the distance between the reflection sheet 12 and the back plate 13 is varied as a whole along the left-right direction.

Figure 11A:
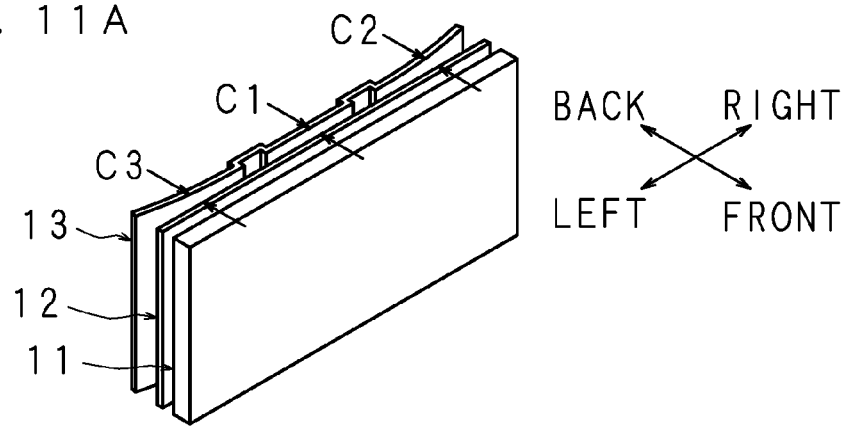
FIG. 11A illustrates the positional relationship among the light guide plate, reflection sheet and back plate constituting the backlight.
Figure 11B:
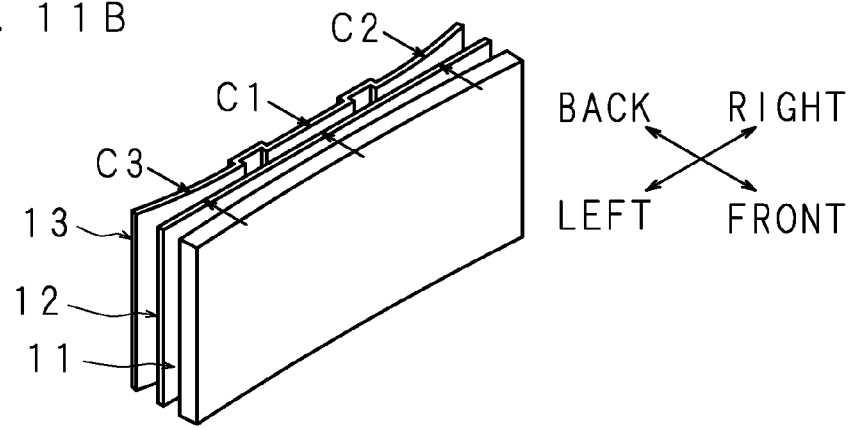
FIG. 11B illustrates the positional relationship among the light guide plate, reflection sheet and back plate constituting the backlight.
Figure 11C:
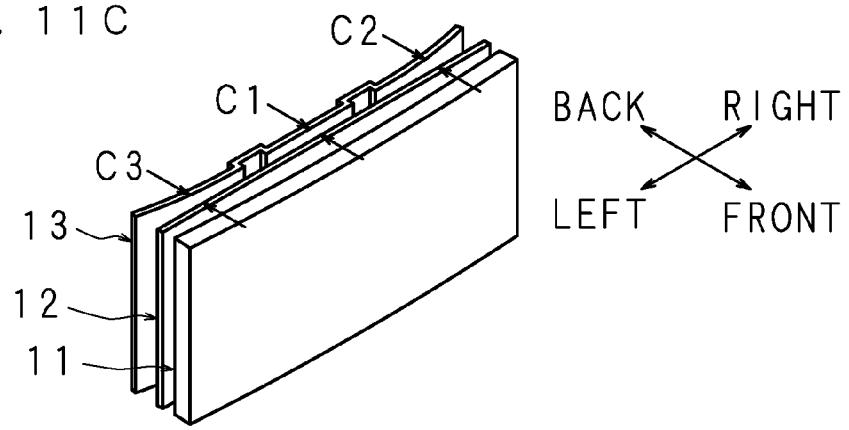
FIG. 11C illustrates the positional relationship among the light guide plate, reflection sheet and back plate constituting the backlight.

FIGS. 11A to 11C each illustrates the positional relationship among the light guide plate 11, reflection sheet 12 and back plate 13 constituting the backlight 1. In Embodiment 7, the back plate 13 has a shape slightly warped in the front-back direction. Thus, as illustrated in FIG. 11A, the dimensions of the gap between the reflection sheet 12 and the back plate 13 vary along the left-right direction. The dimension c1 near the middle part is small, whereas the dimension c2 at the position on the right side of the middle part and the dimension c3 at the position on the left side of the middle part are larger than c1. Accordingly, the reflection sheet 12 is restricted from moving when expanded or contracted, so that the luminance unevenness may be prevented even if local flexure occurs in the reflection sheet 12. FIG. 11B illustrates the case where the light guide plate 11 is warped toward the back plate 13 side (rear side) in the left-right direction (horizontal direction). In such a case also, the gap has larger dimensions at the left and right compared to the middle part, so that the luminance unevenness may be prevented even if the light guide plate 11 is warped. FIG. 11C illustrates the case where the light guide plate 11 is warped toward the opposite side of the back plate 13 (front side) in the left-right direction. In such a case, the reflection sheet 12 is not restricted at the middle, left and right parts and thus no flexure occurs in the reflection sheet 12, so that the luminance unevenness may be prevented.

According to Embodiment 7, the gap dimensions between the reflection sheet 12 and the back plate 13 are changed in accordance with the distance from the center of the backlight 1 in the left-right direction, so that the flexure in the reflection sheet 12 may be prevented even if the light guide plate 11 is warped due to heat. This makes it possible to prevent luminance unevenness of the backlight 1.

Embodiment 8

The gap dimensions between the reflection sheet 12 and the back plate 13 may be not regularly but randomly changed. FIG. 12 is an explanatory view illustrating the positional relationship among the light guide plate 11, reflection sheet 12 and back plate 13 constituting the backlight 1. The dimensions of the gap between the reflection sheet 12 and the back plate 13 are randomly varied. Moreover, the bent part is formed as a curved surface so that the reflection sheet 12 will not get stuck therewith. Thus, local loosening is unlikely to occur even when the reflection sheet 12 is moved. As a result, luminance unevenness due to loosening of the reflection sheet 12 may be prevented, which can further prevent lowering in the display quality.

While Embodiments 1 to 5 described that the recessed channel for securing the rigidity of the entire back plate 13 is formed by the right plate-like part 13a, middle plate-like part 13b or left plate-like part 13c and the connecting member 13d, it is not limited thereto. It may also be configured that the right plate-like part 13a, middle plate-like part 13b or left plate-like part 13c is provided with a recessed channel.

It is to be noted that, as used herein and in the appended claims, the singular forms "a", "an", and "the" include plural referents unless the context clearly dictates otherwise.

The technical features (components) described in each example embodiment may be combined with one another, and such combinations may form new technical features.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

The invention claimed is:

1. A light source device, comprising:
   a light guide plate receiving light from a light source through a side surface and emitting the light through one main surface;
   a reflection sheet layered on another main surface of the light guide plate;
   a housing having a back plate provided with a plurality of recessed channels and housing the light guide plate and the reflection sheet in such a manner that the reflection sheet and the back plate face each other; and
   a support member arranged in each of the plurality of the recessed channels and partially supporting the reflection sheet at an opening position of the recessed channel,
   wherein each of the plurality of the recessed channels extends in a first direction substantially parallel to one side of the light guide plate, a portion sandwiched between the two adjacent recessed channels in the back plate constitutes a protrusion protruding toward the reflection sheet side, a dimension between the reflection sheet and each of a plurality of the protrusions arranged in parallel in a second direction orthogonal to the first direction on the back plate is minimum at a first protrusion of the plurality of protrusions that faces a position closest to a middle portion in the second direction of the reflection sheet, and a second protrusion is present where the dimension is larger than the dimension for the first protrusion.

2. The light source device according to claim 1, wherein the back plate is constituted by arranging a plurality of plate-like members side by side and connecting the plate-like members with a connecting member.

3. The light source device according to claim 2, wherein each of the plurality of recessed channels is formed by the connecting member and the plate-like member at both end portions in the second direction of the plate-like members or is formed by end members disposed at both end portions in the second direction of the back plate and the plate-like member.

4. The light source device according to claim 1, wherein a dimension of a gap between the reflection sheet and at least one of the protrusions is increased along a direction from a middle portion toward the end portion in the second direction of the reflection sheet.

5. The light source device according to claim 1, wherein with respect to the plurality of protrusions the dimension becomes larger for a protrusion facing a position closer to the end portion in the second direction of the reflection sheet.

6. The light source device according to claim 1, wherein the back plate is formed by bending one plate-like member.

7. A display apparatus, comprising:
the light source device according to claim 1; and
a display panel provided at one main surface side of the light guide plate to display an image using light entering through the light guide plate.

* * * * *